United States Patent

[11] 3,598,260

| [72] | Inventor | Randall E. Hutson<br>Hernando, Miss. |
|---|---|---|
| [21] | Appl. No. | 591 |
| [22] | Filed | Jan. 5, 1970 |
| [45] | Patented | Aug. 10, 1971 |
| [73] | Assignee | General Metals Corp. |

[54] EQUIPMENT TRAILER
4 Claims, 1 Drawing Fig.

[52] U.S. Cl....................................................... 214/501,
172/605, 214/130 R, 214/518, 280/461 A
[51] Int. Cl......................................................... B60p 3/06
[50] Field of Search............................................ 214/501,
518, 77, 130 R, 148; 280/461, 478, 479; 172/467,
605, 776; 254/127, 128

[56] References Cited
UNITED STATES PATENTS

| 2,786,589 | 3/1957 | Garrett............................ | 214/130. |
| 3,183,982 | 5/1965 | Kopaska........................... | 172/624 |

*Primary Examiner*—Albert J. Makay
*Attorney*—John R. Walker, III

ABSTRACT: An elongated two-wheel trailer having a substantially vertical hoist near one rear corner, the hoist being mounted so as to raise and lower, rotate about its vertical axis, and pivot in a plane defined by its vertical axis and the longitudinal axis of the trailer.

PATENTED AUG 10 1971  3,598,260
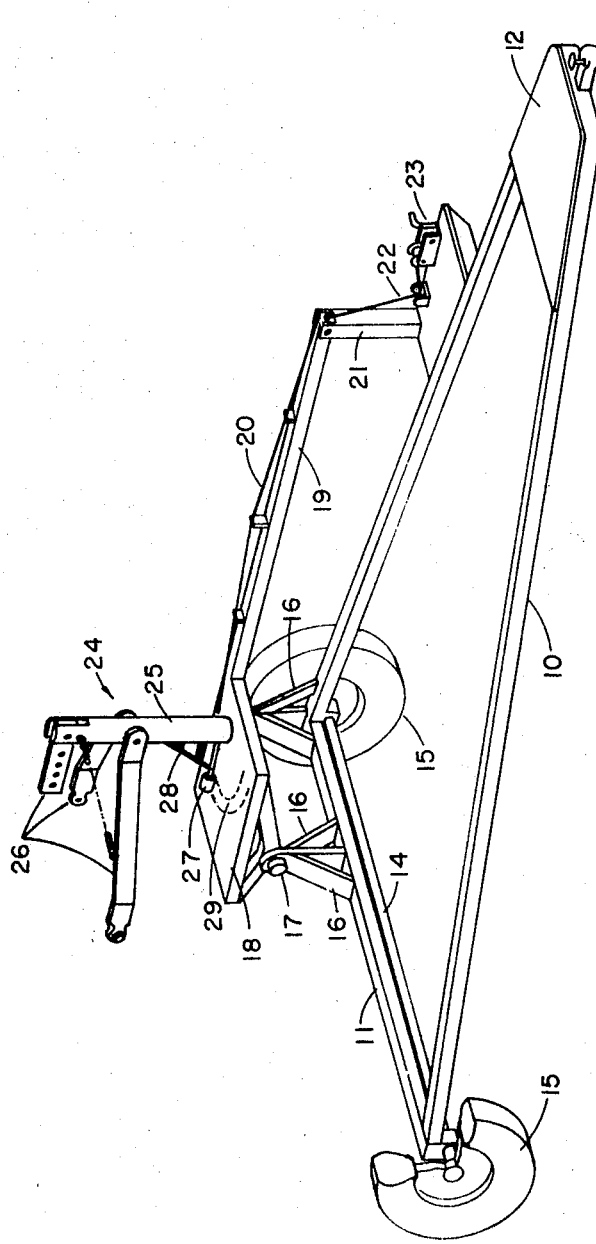
INVENTOR.
RANDALL E. HUTSON
BY
William A. Mikesell
ATTORNEY

EQUIPMENT TRAILER

This invention relates to a trailer suitable for transporting wide, relatively short objects. In one aspect, the invention relates to a trailer suitable for engaging, lifting and rotating into a carrying position loads which are wider than can be conveniently carried in a conventional position.

Much farm equipment, such as disk harrows or ganged plows, is relatively short from front to rear, but because it is designed to simultaneously treat several rows in the field, the equipment is much wider than can be conveniently transported in the usual position on public roads. In the past, it has been necessary either to tow such equipment on the road with suitable warning signs, which is at best a dangerous procedure, or to hoist such equipment on a carrier such as a flatbed truck, which of course requires a hoist capable of lifting to a substantial height.

It is accordingly an object of this invention to provide a trailer capable of engaging and lifting to a relatively low height such short, wide loads, and of then rotating the load into a carrying position wherein the width of the load is longitudinal of the trailer.

Other aspects, objects, and the several advantages of the invention will become apparent upon study of this disclosure, the appended claims, and the drawing, in which:

The sole FIGURE represents a perspective view of an apparatus of the present invention.

Referring now to the drawing, the trailer comprises an elongated frame having longitudinal member 10, a rear transverse member 11, a suitable front tie member 12, and a hitch 13 capable of engaging a motive vehicle such as a tractor or a truck. Located near the rear of the frame is a transverse axle 14 carrying wheels 15.

Mounted near one rear corner of the frame, preferably at the left side, is a support 16, which can comprise a plurality of structural members, on which is mounted a pivot 17. Pivot 17 is arranged with its pivotal axis substantially horizontal and substantially perpendicular to the longitudinal axis of the trailer. Mounted on pivot 17 is a base 18 having an elongated extension 19, preferably extending forward above a frame member 10. Extension 19 can be braced as by truss 20, and its forward end can rest and be locked for transport in a bracket 21 as by cable 22 and winch 23, the latter of which along with bracket 21 can be conveniently mounted on member 10.

Base 18 carries a hoist assembly 24 capable of lifting in a direction perpendicular to the surface of base 18. Hoist assembly 24 can comprise a pivot pin (not shown) perpendicular to base 18, which fixed pin is surrounded by a column 25 free to rotate about the pin. Column 25 can be supported on suitable thrust bearings (not shown) on base 18, so as to rotate freely about the pin under load. Column 25 is provided near its upper end with a load-engaging hitch 26 suitable for engaging the load to be hauled; such hitch will generally be the conventional "3-point" or other hitch used on farm implements. At the base of column 25 directly below hitch 26 is an outrigger roller bearing 27 supported preferably by a brace 28 and running on an arcuate path 29 on base 18. Although hoist assembly 24 can be provided with means, such as a screw lift or a hydraulic cylinder, to raise and lower column 25 with respect to base 18, such mechanism is preferably not included as being unnecessary because of the action of pivot 17, as will be explained.

In operation, the trailer is connected by hitch 13 to a suitable motive vehicle such as a tractor. The trailer and tractor are then backed up to the load so that hitch 26 is immediately in front of the hitch on the load. Next, winch 23 is unreeled to allow base 18 and its extension 19 to pivot or tilt upward and to the rear about pivot 17. Hitch 26 is then engaged with the load's hitch. Winch 23 is then reeled in so as to bring base 18 and extension 19 into a level position as shown in the drawing. Extension 19 can now be locked or pinned to bracket 21 for transit. The act of returning base 18 to its horizontal position as just described causes the load to be lifted off the ground, although the width of the load will typically protrude beyond the width of the trailer on both sides. Finally, the entire load is rotated approximately 90° around the hoist assembly vertical axis by rotating column 25. Where, as in the drawing, hoist assembly 24 is located at the left rear of the trailer, the load will be rotated counterclockwise to the transit position such that the width dimension of the load is now longitudinal of the trailer. The load can then be secured in position e.g. with cables.

The load is unloaded from the trailer by reversing the operations for loading.

The trailer is designed such that its length, from hoist assembly 24 to hitch 13, is greater than the widest load to be hauled, as measured from the hitch on the load to its right side where hoist assembly 24 is on the left side of the trailer. Mounting hoist assembly 24 on the left side of the trailer has the advantage of assuring proper traffic clearance along the left side of the loaded trailer.

Having thus described the invention, what I claim is:

1. A trailer for carrying a wide load in a rotated position comprising:
   a. elongated frame means having supporting wheel means near a first end and motive-vehicle-engaging means at its second end;
   b. pivot means mounted above said frame means adjacent said first end, the axis of said pivot means being substantially horizontal and substantially perpendicular to the longitudinal axis of said frame means;
   c. base means operatively mounted above said pivot means;
   d. means for moving said base means through an arc about said pivot means;
   e. hoist means rotatably mounted on said base means, the rotational axis of said hoist means being substantially vertical when said base means is substantially horizontal; and
   f. load-engaging means on said hoist means above said base means.

2. The trailer of claim 1 wherein said means for moving of paragraph (d) comprises an elongated extension on said base means toward said second end, and winch means mounted on said frame means for pulling said extension means downwardly toward said frame means.

3. The trailer of claim 1 further provided with braced outrigger bearing means at the lower end of said hoist means and aligned vertically below said load-engaging means.

4. The trailer of claim 3 wherein said load-engaging means comprises 3-point hitch means.